(12) United States Patent
von Blücher

(10) Patent No.: US 8,176,659 B2
(45) Date of Patent: May 15, 2012

(54) PROTECTIVE FOOTWEAR

(75) Inventor: Hasso von Blücher, Erkrath (DE)

(73) Assignee: Blücher GmbH, Erkrath (DE)

( * ) Notice: Subject to any disclaimer, the term of this patent is extended or adjusted under 35 U.S.C. 154(b) by 1232 days.

(21) Appl. No.: 10/834,776

(22) Filed: Apr. 28, 2004

(65) Prior Publication Data

US 2005/0076541 A1 Apr. 14, 2005

(30) Foreign Application Priority Data

Oct. 9, 2003 (DE) .................................. 103 47 673

(51) Int. Cl.
*A43B 13/22* (2006.01)
(52) U.S. Cl. ............................. 36/113; 36/45; 36/72 R
(58) Field of Classification Search .................. 36/11, 3, 36/72 R, 45, 30 R
See application file for complete search history.

(56) References Cited

U.S. PATENT DOCUMENTS

| | | | | |
|---|---|---|---|---|
| 4,292,746 A | * | 10/1981 | Delaney ............................ | 36/83 |
| 4,430,811 A | * | 2/1984 | Okada ............................... | 36/45 |
| 4,454,191 A | | 6/1984 | von Blücher et al. | |
| 4,843,739 A | | 7/1989 | von Blücher et al. | |
| 4,904,343 A | | 2/1990 | Giglia et al. | |
| 4,930,175 A | * | 6/1990 | Chen ............................ | 12/142 R |
| 5,154,960 A | * | 10/1992 | Mucci et al. .................... | 428/68 |
| 5,216,825 A | * | 6/1993 | Brum ............................... | 36/44 |
| 5,738,937 A | * | 4/1998 | Baychar ....................... | 428/316.6 |
| 5,979,081 A | * | 11/1999 | Vaz ............................... | 36/107 |
| 6,151,802 A | * | 11/2000 | Reynolds ......................... | 36/55 |
| 6,425,193 B2 | * | 7/2002 | Vaz .................................. | 36/30 R |
| 6,981,341 B2 | * | 1/2006 | Baychar .......................... | 36/24.5 |
| 2003/0236047 A1 | | 12/2003 | Ramkumar | |
| 2005/0266749 A1 | | 12/2005 | De Ruiter | |

FOREIGN PATENT DOCUMENTS

| | | |
|---|---|---|
| DE | 28 14 209 | 7/1979 |
| DE | 31 32 324 | 3/1983 |
| DE | 37 16 303 | 11/1988 |
| DE | 195 19 869 | 12/1996 |
| EP | 0 465 817 | 1/1992 |
| EP | 0 525 409 | 2/1993 |
| FR | 2 198 893 | 4/1974 |
| GB | 2 096 536 | 10/1982 |
| WO | WO 2004/020089 | 3/2004 |

OTHER PUBLICATIONS

European Search Reports for the corresponding European Application No. EP 07 01 6528.

* cited by examiner

*Primary Examiner* — Jila Mohandesi
(74) *Attorney, Agent, or Firm* — Cozen O'Connor

(57) ABSTRACT

A shoe, especially a boot, which has a protective function against toxic chemical agents, especially chemical warfare agents, and a multilayer layered construction, which has an outer layer, which faces away from the foot when the shoe is worn, and an inner layer, especially an inner shoe lining, which is assigned to the outer layer and faces towards the foot when the shoe is worn, wherein, in addition, an adsorption layer based on an adsorbent material, especially activated carbon, which adsorbs toxic chemical agents, is arranged between the outer layer and the inner layer. In this way, efficient protection against toxic chemical agents, especially chemical warfare agents is achieved, and a high degree of wearing comfort is achieved at the same time.

23 Claims, 3 Drawing Sheets

PROTECTIVE FOOTWEAR

CROSS REFERENCE TO RELATED APPLICATIONS/PRIORITY CLAIM

This application claims priority based on German patent application No. 103 47 673.3, filed on Oct. 9, 2003.

BACKGROUND OF THE INVENTION

1. Field of the Invention

The present invention to relates footwear, such as a shoe, especially a boot, with a protective function against toxic chemical agents, especially chemical warfare agents, and Nuclear, Biological, and Chemical (NBC) agents, and which is intended for military and general NBC protective use.

2. Description of the Related Art

There are a number of substances that are absorbed by the skin and exposure to which results in severe physical damage. Examples are mustard gas (usually contained in vessels marked with a yellow cross), which is a vesicant, and sarin, which is a nerve gas. Individuals who may come into contact with these toxic agents must wear suitable protective equipment or otherwise be protected against these toxic agents by suitable protective materials.

Suitable protective suits are available for protecting the body, especially the extremities and the trunk. To protect the head, especially the face, and the respiratory tract, gas masks (NBC protective masks), often together with hoods, are usually worn.

In addition, however, it is also important that the feet are adequately protected against these types of toxic agents. In particular, protective footwear of this type must be suitable for military or general NBC protective applications.

In the state of the art with respect to military and general NBC protective applications, overshoes with NBC protection are presently often used for this purpose. They are worn over regular footwear. This has the crucial disadvantage that the footwear is burdened with additional weight and, in addition, that wearing comfort is drastically reduced due to the NBC overshoe. Finally, with the use of NBC overshoes, it is not possible to achieve an efficient seal with an NBC protective suit, so that toxic chemical agents, e.g., chemical warfare agents, can penetrate between the NBC overshoe and the NBC protective suit and act on the individual wearing the NBC protective suit.

The alternative use of NBC protective socks, which, for example, can be worn in conventional military boots, is similarly inefficient, since, for one thing, they cannot prevent toxic agents from penetrating the footwear itself and, for another, the wearing comfort is not very great. Here again, there is the problem of a deficient seal between the socks and the protective suit.

SUMMARY OF THE INVENTION

Therefore, the object of the present invention is to make available protective footwear, such as a shoe, especially a boot, which acts to protect against toxic chemical agents, especially chemical warfare agents, which is suitable both for military and general NBC use, and at least partially avoids the aforementioned disadvantages of the state of the art.

To achieve the stated object, the present invention discloses footwear, such as a shoe, especially a boot (e.g., military boot or NBC boot), in accordance with claim 1. Other advantageous refinements of the footwear of the invention are specified in the dependent claims.

In the following, reference is made generally to an embodiment of the present invention represented by a shoe, however it is to be understood that this is done for convenience of description and that this is a non-limiting example, with the present invention being applicable to and encompassing other forms of protective footwear as well.

Accordingly, the present invention provides a shoe with a multilayer construction, which has an outer layer which is farthest from (distal from) the foot when the shoe is worn, and an inner layer, such as an inner shoe lining, which is arranged adjacent to the outer layer, and is nearest to (proximate to) the foot when the shoe is worn, and such that the multilayer-construction provides a protective function against toxic chemical agents, especially chemical warfare agents. This protective function is further enhanced by the presence of an adsorption layer, based on an adsorbent material, such as activated carbon, that adsorbs toxic chemical agents, with the adsorption layer being arranged or provided between the outer layer and the inner layer.

The presence of the adsorption layer, which is arranged between the inner and outer layers, makes it possible to prevent toxic chemical agents, especially chemical warfare agents, which may have penetrated the outer layer of the shoe, from coming into contact with the foot, since they are absorbed or adsorbed by the adsorbent material of the adsorption layer, and in this way are rendered harmless.

The protective function of the adsorption layer, and ultimately the shoe, can be further enhanced by additionally providing the shoe of the invention with at least one membrane that is impermeable or at least has a very low permeability to toxic chemical agents, especially chemical warfare agents, or which at least retards their passage. The membrane may be arranged either between the outer layer and the adsorption layer or between the inner layer and the adsorption layer. It is, however, advantageous to place the membrane between the outer layer and the adsorption layer, so that toxic chemical agents, especially chemical warfare agents, that may have penetrated the outer layer never reach the adsorption layer or, for the most part, do not reach the adsorption layer, so that the adsorption capacity of the adsorption layer remains substantially unexhausted. At the same time, the provision of this additional membrane allows for good decontamination, regeneration and reusability of the shoe of the invention after it has been subjected to exposure to toxic substances.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Other advantages, properties, aspects and features of the present invention are apparent from the following description of a preferred embodiment of the invention, which is shown in the drawings.

In the drawings.

DETAILED DESCRIPTION OF THE PRESENTLY PREFERRED EMBODIMENTS

Figure 1:
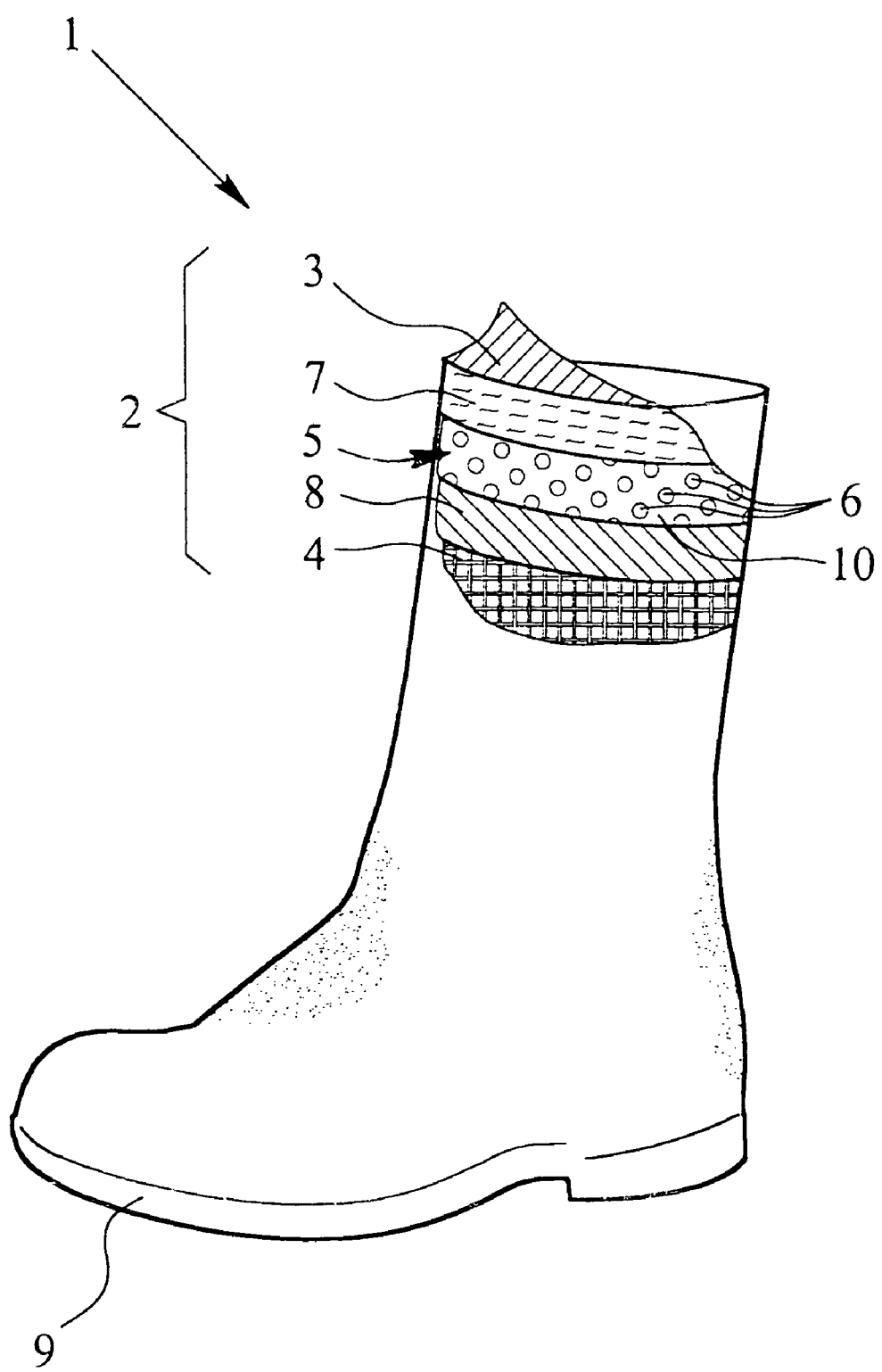
FIG. 1 is a schematic representation of a shoe, especially a boot, in accordance with a preferred embodiment of the invention.

Referring now to the drawings, FIG. 1 shows a shoe 1, especially a boot, in accordance with the invention, which acts to protect against toxic chemical agents, especially chemical warfare agents. The shoe 1 of the invention has a multilayer construction 2 with an outer layer 3 which is farthest from the foot when the shoe is worn, and an inner layer 4, such as an inner shoe lining, arranged adjacent to the outer layer 3, such that the inner layer 4 is nearest to the foot when the shoe is worn. In accordance with the invention, an adsorption layer 5 with an adsorbent material 6, such as activated carbon, that adsorbs toxic chemical agents, is placed between the outer layer 3 and the inner layer 4. This provides both efficient protection against toxic chemical agents, especially chemical warfare agents, as well as a high degree of wearing comfort.

Figure 2:
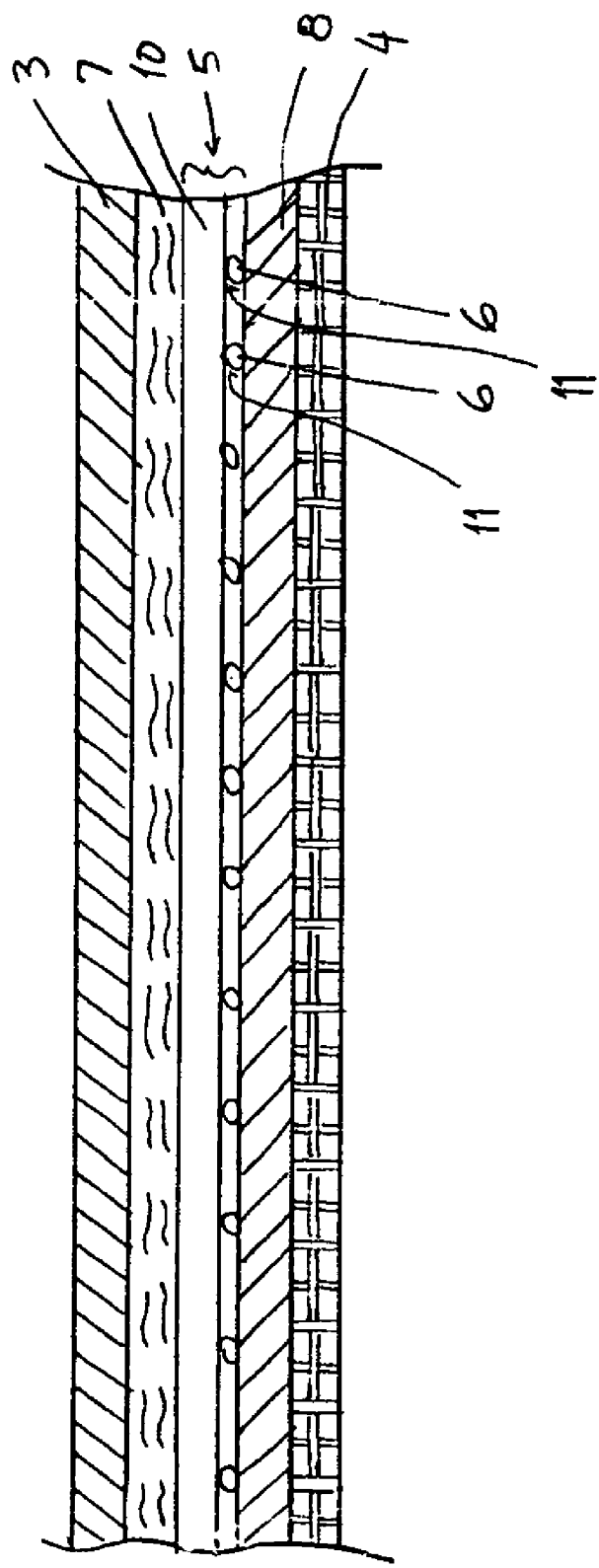
FIG. 2 shows a schematic cross section through the layered construction of a shoe, especially a boot, in accordance with a preferred embodiment of the invention.

As FIGS. 1 and 2 show, the shoe 1 of the invention may also be provided, in addition to the adsorption layer 5, with at least one membrane 7 that is substantially impermeable to toxic chemical agents, especially chemical warfare agents, or at least retards their passage. To increase wearing comfort of the shoe, it is advantageous to design this membrane 7 to be substantially impermeable to water in liquid form, and/or to air, but permeable to water vapor. The membrane 7 may alternatively be arranged either between the outer layer 3 and the adsorption layer 5 or between the inner layer 4 and the adsorption layer 5. However, the membrane 7 is preferably placed between the outer layer 3 and the adsorption layer 5 (i.e., on the side of the adsorption layer 5 that faces away from the foot when the shoe is worn), so that toxic chemical agents that may have penetrated the outer layer 3 of the shoe 1 are held back by the membrane 7 and therefore never reach the adsorption layer 5 at all, or at most reach it in only very small amounts. In this way, the adsorption capacity of the adsorption layer remains substantially unexhausted. In addition, the presence of the membrane provides additional protection to the wearer of the shoe 1. This means that the shoe has a double protective function against toxic chemical agents (due to the barrier effect of the membrane 7, as well as due to the adsorptive effect of the adsorption layer 5). The presence of membrane 7 also makes it possible to decontaminate and regenerate the shoe 1, since toxic agents that may have penetrated the outer layer 3 can be removed from the membrane by suitable treatment methods (e.g., rinsing it off), for example, with decontamination solutions that are suitable for this purpose and very well known to those skilled in the art.

In addition, a spacing layer 8, e.g., in the form of a nonwoven fabric, a thin layer of cellular plastic, or a textile cloth (e.g., a knitted fabric), may be placed between the inner layer 4 and the adsorption layer 5 or between the inner layer 4 and the membrane 7 (depending on the sequence of layers 4, 5 and 7 in the layered construction 2). It is advantageous for the spacing layer 8 to be placed immediately next to the inner layer 4 (i.e., immediately adjacent to the outwardly facing side of the inner layer 4, which is the side of the inner layer 4 that faces away from the foot when the shoe is worn). The additional spacing layer 8 has the advantage that it reduces the mechanical stress on the adsorption layer 5 or membrane 7, because an additional layer is present between the inner layer 4, and the adsorption layer 5 or membrane 7, which can absorb or dampen mechanical stresses. In addition, this prevents contaminants derived from the person wearing the shoe 1 (such as foot sweat) from unnecessarily loading the adsorbent material 6 of the adsorption layer 5. In this way, the efficiency of the adsorption layer 5 is also increased. Furthermore, the additional spacing layer 8 enhances the wearing comfort of the shoe 1 of the invention, and especially provides a feeling of softness when the shoe is worn.

In general, the individual layers 3, 4, 5, 7, and 8 of the layered construction 2 are joined together. This is accomplished by methods that are already well known in the art (e.g., by adhesive bonding, heat sealing, sewing, stitching, etc.). It is advantageous to join or fix the individual layers 3, 4, 5, 7, and 8 of the layered construction 2 seamlessly, preferably without damaging the individual layers 3, 4, 5, 7, and 8 (e.g., by adhesive bonding, heat sealing, etc.). If the layers 3, 4, 5, 7, and 8 are joined, at least partially, by sewing or similar methods, it is advisable to seal the seams (e.g., with so-called seam-sealing tape). It is particularly desirable that, the individual layers 3, 4, 5, 7, and 8 of the layered construction 2 form a cohesive composite.

The individual layers 3, 4, 5, 7, and 8 of the layered construction 2 may extend over the entire foot, including the sole, ankle and part of the lower calf. In accordance with this embodiment, the individual layers 3, 4, 5, 7, and 8 of the layered construction 2 form a cohesive boot in the shape of a foot with a leg (bootie), which is joined to or furnished with a shoe sole 9 in the region of the sole of the foot (e.g., joined with a shoe sole 9 by adhesive bonding or the like).

In accordance with an alternative embodiment, the individual layers 3, 4, 5, 7, and 8 of the layered construction 2 do not extend over the area of the sole, but rather only over the rest of the area of the foot, i.e., over the area of the dorsum of the foot (instep), the ankle, and part of the calf in the case of a boot; in this embodiment, the individual layers 3, 4, 5, 7, and 8 of the layered construction 2 are sealed with the sole 9 along the area of the contours of the foot. In accordance with this embodiment, where the area of the sole of the foot is concerned, an insole (e.g., in the form of a shoe insert or integrated in the sole of the shoe itself) can be provided with an adsorbent, especially activated carbon, which adsorbs toxic chemical agents. However, this is not absolutely necessary, because the layered construction 2 and the sole 9 of the shoe, which are sealed together, already ensure efficient protection against toxic chemical agents, especially chemical warfare agents, and at the same time a high degree of wearing comfort.

To prevent toxic chemical agents, especially chemical warfare agents, from being able to penetrate the shoe through the sole 9, the sole 9 is generally made of a material that is substantially impermeable to toxic chemical agents, especially chemical warfare agents, or at least retards their passage. In general, the sole 9 is also substantially impermeable to water and/or air. In general, for these purposes, the sole 9 can be made of plastic or rubber materials that are well known to persons skilled in the art for these purposes. To ensure an efficient protective function, the sole 9 of the shoe should be joined to the layered construction 2 to form a seal, especially in the region of the transition of the sole 9 and layered construction 2; this is accomplished by means that are already well known in the art (e.g., by sewing, adhesive bonding and/or heat sealing, etc.). In this way, the area of the sole of the foot and the other areas of the foot are sufficiently protected against the penetration of toxic chemical agents.

The outer layer 3 of the shoe 1 of the invention can be made of a breathable, especially water vapor-permeable, material, e.g., leather or polyamides (especially nylon, such as Cordura® by Du Pont). Examples of this are dense and resistant polyamide or nylon cloths, especially woven or knitted fabrics. In regard to the use of breathable materials as the outer layer 3, it is advisable to render the material oleophobic and/or hydrophobic, especially by a special impregnation, to prevent or retard the penetration of toxic chemical agents (e.g., concentrated drops of chemical warfare agents). Alternatively, however, the outer layer 3 may also consist of a plastic material, e.g., butyl rubber and rubbers (e.g., chloroprene rubbers, such as neoprenes or fluoro rubbers), but also fluoro elastomers (e.g., Viton® by Du Pont, Dow elastomers L.L.C.); in this case, oleophobic or hydrophobic treatment is unnecessary, since these materials are already inherently oleophobic and hydrophobic.

With respect to the material for the inner layer 4, especially the inner lining of the shoe, any desired textile materials may be used, preferably air-permeable textile materials, e.g., textile cloths. Nonlimiting examples are woven fabrics, knitted fabrics, knitted fabrics, layered fabrics, bonded fabrics, and nonwoven fabrics. Preferably, a woven or knitted fabric or a nonwoven fabric is used as the material for the inner layer.

With respect to the adsorption layer 5, it is generally discontinuously formed, i.e., the adsorption layer 5 generally comprises discrete particles of adsorbent 6 (e.g., based on activated carbon) that adsorb toxic chemical agents and can be fixed on a substrate 10 by an adhesive 11. The adsorbent material 6 of the adsorption layer 5 is preferably a material based on activated carbon, which contains or consists of activated carbon, preferably in the form of activated carbon particles and/or activated carbon fibers.

With the use of an adsorption layer based on activated carbon, the good wearability characteristics of the shoe 1 of the invention are still further improved by the buffering effect of the activated carbon, because the activated carbon acts as a moisture or water store or buffer (e.g., for foot sweat). With the use, for example, of activated carbon spherules as the adsorbent material for the adsorption layer, coverage of up to about 250 $g/m^2$ or more are usual, so that, for example, in the event of heavy sweating, about 40 $g/m^2$ of moisture can be stored, which, in the case of an outer layer 3 that is capable of breathing, can again be released to the outside again.

In general, the adsorption layer 5 is designed as an adsorption surface filter. For this purpose, the adsorption layer 5 contains an adsorbent material that adsorbs toxic chemical agents and is based, preferably, on activated carbon, e.g., in the form of activated carbon particles and/or activated carbon fibers, and the adsorbent material 6 is generally fixed on a substrate 10, especially a textile substrate. The adsorbent material 6 of the adsorption layer 5 is preferably applied on the side of the substrate 10 facing away from the foot when the shoe is worn, but it is also basically possible to apply the adsorbent material 6 to both sides of the substrate 10. However, it is generally sufficient to apply the adsorbent material 6 to only one side of the substrate 10. The adsorbent material 6 is fixed on the substrate 10 by methods that are well known to persons of skill in the art, for example, by continuous or, preferably, discontinuous application of an adhesive 11 on the substrate, followed by fixation of the adsorbent material 6 on the adhesive 11. To increase the wearing comfort, especially to avoid stiffness of the substrate 10, discontinuous application of the adhesive, especially spot application of the adhesive, is preferred, i.e., it is advantageous to apply the adsorbent material 6 to the substrate discontinuously or in spots in a preferably regular pattern or grid. In this case, the actual adsorbent material 6 may be lined by a preferably air-permeable textile material, especially a textile cloth as a cover layer, to reduce mechanical stress on the adsorbent material (e.g., with a cloth with a low weight per unit area of 5-75 $g/m^2$, preferably 10-50 $g/m^2$, and more preferably 15-30 $g/m^2$). However, the use of this type of cover layer or liner is optional. To achieve an efficient adsorption capacity, it is preferred that at least 50% of the substrate 10 be covered with adsorbent material 6, preferably at least 60%, more preferably at least 70%, still more preferably at least 75%, and most preferably at least 80%. In this regard, the amount and type of adhesive 11 and especially its viscosity must be planned in such a way that the adsorbent material 6 of the adsorption layer 5 is freely accessible to the toxic chemical agents, especially chemical warfare agents, that are to be absorbed, i.e., the adsorbent material 6 must not be completely pressed into or completely sink into the adhesive 11; the extent to which the adsorbent material 6 is accessible to toxic chemical agents should be at least 50%, preferably at least 60%, and more preferably at least 70%.

In accordance with another embodiment of the invention, which is not shown in FIGS. 1 and 2, the membrane 7 simultaneously serves as the substrate 10 for the adsorbent material 6. In this case, the membrane 7 can be impressed or covered with the adsorbent material 6, for example, by adhesive bonding to the membrane 7, of particles of activated carbon, preferably in granular or spherical form, in the manner described above. In this embodiment, it is preferable to position the membrane 7 such that the adsorbent material 6 is facing the foot, in order that any toxic chemical agents that may penetrate the material of the outer layer 3 hit the membrane 7 first and are blocked by it, so that no toxic chemical agents or at most only very small amounts of toxic chemical agents can reach the adsorbent material 6 of the adsorption layer 5. As described above, the adsorbent material 6 of the adsorption layer 5 can consist, for example, of discrete particles of activated carbon, preferably in granular form ("granular carbon") and preferably in spherical form ("spherical carbon"). In this case, the mean diameter of the particles of activated carbon is less than 1.0 mm, preferably less than 0.8 mm, and more preferably less than 0.6 mm, but in general at least 0.1 mm. In this embodiment, the particles of activated carbon are generally applied to the substrate material 10 in amounts of 5-500 $g/m^2$, preferably 10-400 $g/m^2$, more preferably 20-300 $g/m^2$, still more preferably 25-250 $g/m^2$, even still more preferably 50-150 $g/m^2$, and most preferably 50-100 $g/m^2$. Suitable activated carbon particles have a specific surface (BET) of at least 800 $m^2/g$, preferably at least 900 $m^2/g$, and more preferably at least 1,000 $m^2/g$, and with a most preferred range being from 800 to 1,500 $m^2/g$. Granular carbon, especially spherical carbon, has an advantage that it is extremely abrasion-resistant and very hard, which is important in regard to wear properties. In general, the bursting pressure for an individual activated carbon particle, especially an activated carbon granule or spherule, is preferably at least about 5 newtons, more preferably at least about 10 newtons, and most preferably as high as about 20 newtons.

In accordance with an alternative embodiment, the adsorbent material 6 of the adsorption layer 5 may consist of activated carbon fibers, especially in the form of activated carbon cloths. Activated carbon cloths of the appropriate type may have, for example, weights per unit area of 20-200 $g/m^2$, preferably 30-150 $g/m^2$, and more preferably 50-120 $g/m^2$. These activated carbon cloths may be, for example, activated carbon woven fabrics, knitted fabrics, layered fabrics, nonwoven fabrics, or bonded fabrics (e.g., based on carbonized and activated cellulose and/or carbonized and activated acrylonitriles).

Similarly, it is also possible to combine activated carbon particles and activated carbon fibers with each other as the adsorbent material 6 of the adsorption layer 5. Activated carbon particles have the advantage of a higher adsorption capacity, while activated carbon fibers exhibit better adsorption kinetics.

To increase the adsorption efficiency or adsorption capacity, it is also possible to impregnate the adsorbent material 6 of the adsorption layer 5, especially the activated carbon particles and/or activated carbon fibers, with at least one catalyst. Examples of catalysts that are suitable in accordance with the invention are enzymes and/or metal ions, preferably copper, silver, cadmium, platinum, palladium, zinc and/or mercury ions. The amount of catalyst may vary within wide ranges; in general, the amount of catalyst is 0.05 to 12 wt. %, preferably 1-10 wt. %, and more preferably 2-8 wt. %, based on the weight of the adsorption layer 5.

With respect to the membrane 7 that is optionally provided, it may be a continuous, especially closed, and at most, microporous membrane. The thickness of the membrane 7 may vary within a wide range; in general, the thickness is in the range of 1-500 μm, especially 1-250 μm, preferably 1-100 μm, more preferably 1-50 μm, still more preferably 2.5-30 μm, and most preferably 5-25 μm. To enhance wearing comfort, the membrane 7 that is optionally provided should be permeable to water vapor. Specifically, at 25° C. and a membrane thickness of 50 μm, the membrane 7 should have a water vapor permeability of at least 12.5 L/m$^2$ per 24 hours, preferably at least 17.5 L/m$^2$ per 24 hours, and most preferably at least 20 L/m$^2$ per 24 hours, or even greater (measured by the inverted cup method in accordance with ASTM E 96 at 25° C.). (For further details on the measurement of water vapor transmission (WVT) reference is made to McCullough et al.: "A comparison of standard methods for measuring water vapor permeability of fabrics" in *Meas. Sci. Technol. [Measurement Science and Technology]*, Vol. 14, pp. 1402-1408, August 2003.) Providing a membrane 7 with high water vapor permeability ensures an especially high degree of wearing comfort.

For purposes of the present invention, under steady-state conditions at 35° C. and a thickness of 50 μm, the membrane 7 should have a water-vapor resistance $R_{et}$ of a maximum of 25 (m$^2$•pascal)/watt, preferably a maximum of 20 (m$^2$•pascal)/watt, and more preferably a maximum of 13 (m$^2$·pascal)/watt (measured by DIN EN 31 092:1993 of February 1994 ("Textiles—Physiological Effects—Measurement of thermal and water-vapor resistance under steady-state conditions ("sweating guarded-hotplate test") or by the parallel international standard ISO 11 092).

The membrane 7 that is optionally provided should be capable of swelling or absorbing water only slightly at most; in particular, the swelling capacity and/or the water absorption capacity of the membrane 7 should be a maximum of 35% and preferably a maximum of 25%, based on the weight of the membrane 7 itself. Membranes 7 that are suitable in accordance with the invention are substantially impermeable to liquids, especially water, and/or to aerosols, or they should at least retard their passage. To achieve a swelling capacity that is at most very low, the membrane 7 should have no or essentially no strongly hydrophilic groups, especially no hydroxyl groups. However, for purposes of slight swelling, the membrane 7 may have weakly hydrophilic groups, especially polyether groups.

The membrane 7 that is optionally provided may consist of or contain a plastic or polymer material. A suitable plastic or polymer may be selected, for example, from the group consisting of polyurethanes, polyether amides, polyester amides, polytetrafluoroethylenes, and/or polymers based on cellulose and/or derivatives of these compounds. For example, the membrane 7 may be obtained as the reaction product of the reaction of an isocyanate, especially a masked or blocked isocyanate, with an isocyanate-reactive crosslinking agent. Thus, the membrane 7 may be, for example, a polyurethane-based membrane. Similarly, the membrane 7 may also be an expanded, possibly microporous, membrane based on polytetrafluoroethylene.

Figure 3:
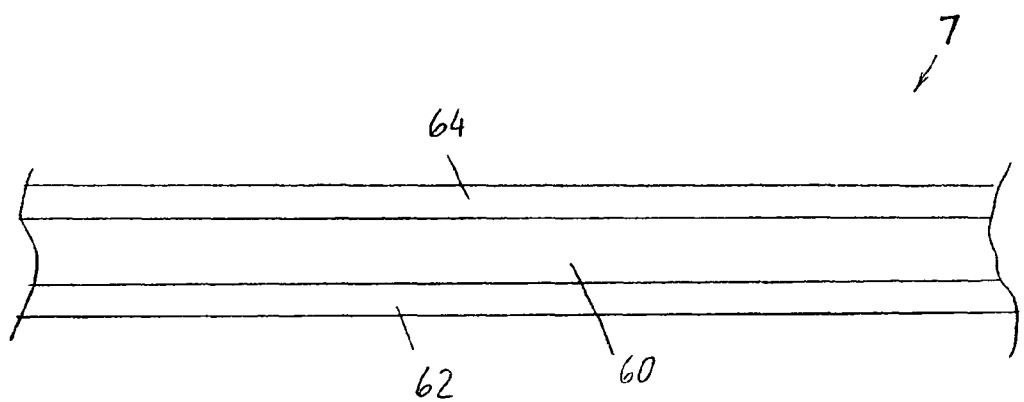
FIG. 3 shows a schematic cross section through a membrane laminate having a core layer and two outer layers.

In accordance with one preferred embodiment shown in FIG. 3, the membrane 7 that is optionally present may be formed as a multilayer laminate or as a multilayer composite. This laminate or composite may have at least two and preferably at least three layers or plies bonded together. For example, this laminate or composite may have a core layer 60, made from a cellulose-based polymer and is bonded to two outer layers 62, 64, which are preferably polyurethane, a polyether amide and/or a polyester amide. In this regard, the core layer 60, made from on a cellulose-based polymer, may be formed as a membrane with a thickness of 1-100 μμm, preferably 5-50 μm, and more preferably 10-20 μm, and each of the two outer layers bonded to the core layer may be formed as a membrane with a thickness of 1-100 μm, preferably 5-50 μm, and more preferably 5-20 μm. This feature of the membrane 7 makes it possible to combine barrier layer materials, each with different properties, especially different water vapor permeabilities and barrier effects with respect to toxic chemical agents, and thus to optimize the properties of the membrane 7. For example, cellulose and cellulose derivatives are excellent barrier layer materials, especially towards noxious and toxic chemical substances, such as chemical warfare agents (mustard gas, etc.), and are not attacked or dissolved by these materials, while polyurethane-based materials prevent the migration or diffusion of the plasticizers that may be present in the cellulose layer and, in addition, dampen the crackling noise caused by the cellulose-based core layer when the shoe is worn. Therefore, in accordance with this embodiment, it is preferred, in the case of a membrane laminate or composite, for the core layer 60 to be formed of a cellulose based polymer, and for the two outer layers 62, 64 of the membrane 7 to be formed of polyurethane membranes.

To increase the stability of the membrane 7 that is optionally present, it is advantageous to position the membrane 7 on a substrate layer, which is not shown in the drawings (e.g., on a preferably air-permeable textile material, such as a textile cloth, e.g., a woven fabric, machine-knitted fabric, hand-knitted fabric, layered fabric, or bonded fabric). For purposes of the present invention, the membrane 7 may be laminated or bonded on the substrate layer, especially by means of an adhesive, which is preferably applied discontinuously, preferably in dots or spots. In this case, the flat substrate layer for the membrane 7 should have a low weight per unit area, of less than 150 g/m$^2$, preferably less than 100 g/m$^2$, and more preferably less than 40 g/m$^2$. The flat substrate layer for the membrane 7 acts to a certain extent as a protective layer and increases the mechanical stability and tear strength of the membrane 7, which is important especially when the membrane 7 simultaneously serves as the substrate 10 for the adsorbent material 6.

To enhance the wearing comfort, and to achieve good wear resistance, it is advantageous that the membrane 7 have a certain elasticity. In particular, it is advantageous, that the membrane 7 is capable of being elongated or stretched at least in one direction by at least 10%, preferably at least 20%, and more preferably at least 30%. For purposes of the present invention, the layered construction 2 as a whole should have not only good suppleness, but also a certain elasticity; compared to the elasticity of the membrane 7, the elasticity of the layered construction 2 as a whole is lower, and, in general, the layered construction 2 as a whole can be elongated or stretched at least in one direction by at least 5%, and preferably at least 10%.

In accordance with another embodiment of the present invention, which is not shown in FIGS. 1 and 2, the membrane 7 may simultaneously constitute the adhesive layer 11 for bonding the adsorbent material 6 on the substrate 10. In this case, the membrane 7 must be applied as a continuous layer and must have adhesive properties for fixing the adsorbent material 6 on the substrate 10; in this embodiment, it is preferred to place the membrane 7, which simultaneously acts as the adhesive layer 11, according to the arrangement wherein the membrane 7 is between the adsorption layer 5 and the outer layer 3, rather than between the adsorption layer 5 and the inner layer 4, such that the membrane 7 is on the side that faces away from the foot when the shoe is worn and the adsorbent material 6 is on the side that faces towards the foot when the shoe is worn.

In yet another preferred embodiment, the substrate 10 is completely eliminated, if the membrane alone has sufficient stability to be self-supporting, i.e., in this case, the membrane 7 simultaneously serves as both the substrate 10 and the adhesive layer 11 for the adsorbent material 6 and is thus part of the adsorption layer 5.

The shoe of the invention provides efficient protection from toxic chemical agents, especially chemical warfare agents, and at the same time has a high degree of wearing comfort. A significant advantage of the shoe in accordance with the present invention is that the protective function against toxic chemical agents is integrated in the shoe itself, and no additional item of equipment (e.g., overshoe, sock) is necessary. Compared to the previously described methods of the state of the art, this not only results in considerable weight savings and increased wearing comfort, but also makes possible the achievement of an efficient sealing connection between the shoe and an NBC protective suit, so that toxic chemical agents, e.g., chemical warfare agents, cannot pass through or cannot readily pass through the transition region between the footwear and protective suit. Due to these properties, the shoe in accordance with the present invention is suitable especially for military and general NBC protective use (e.g., in the form of a military style boot or NBC protective boot).

Due to the high degree of efficiency of the protective function of the adsorption layer, which, if necessary, is optionally further enhanced by the use of a membrane, it is also possible to use outer shoe materials that are breathable, e.g., leather, so that the wearing comfort of the shoe is further increased in this way without exposing the wearer of the shoe to increased risk by the use only of an outer shoe material that is breathable, as would be the case when using a shoe not having the protection of the adsorption layer.

The good suppleness of the individual layers of the shoe of the invention or of the layered construction as a whole results not only in a high degree of wearing comfort, but also in good wear resistance of the shoe of the invention.

The design of the shoe in accordance with the invention achieves an excellent barrier effect against chemical warfare agents. The barrier effect against chemical warfare agents, especially bis(2-chloroethyl)sulfide (synonymously known as mustard gas, and which is usually symbolically depicted by a yellow cross on vessels containing this substance), as measured by CRDEC-SP-84010, Method 2.2, is a maximum of 4 $\mu g/cm^2$ per 24 hours, still more preferably a maximum of 3.5 $\mu g/cm^2$ per 24 hours, preferably a maximum of 3.0 $\mu g/cm^2$ per 24 hours, and most preferably a maximum of 2.5 $\mu g/cm^2$ per 24 hours.

The shoe of the invention can be manufactured by methods that are well known in the art. These methods are very well known to experts who are involved in the manufacture of footwear, without a need to provide more detailed information thereon.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. Protective footwear for providing protection against toxic chemical agents, said protective footwear comprising:
   a.) an outer layer, distal from a foot of a person wearing said protective footwear, said outer layer being rendered oleophobic and hydrophobic for one of preventing and retarding penetration of toxic chemical agents;
   b.) an inner layer, proximal to a foot of a person wearing said protective footwear;
   c.) an adsorption layer, between said outer layer and said inner layer, and comprising an adsorption surface filter containing an adsorbent material for adsorbing toxic chemical agents, said adsorbent material of said adsorption layer being fixed to a textile substrate and comprising activated carbon in a form selected from the group consisting of particles and fibers;
   d.) at least one membrane that is substantially impermeable to toxic chemical agents, wherein said at least one membrane is arranged between said outer layer and said adsorption layer and wherein said membrane is substantially impermeable to liquids, liquid water, air, and aerosols, and is substantially permeable to water vapor;
   e.) a spacing layer configured to reduce the mechanical stress on the adsorption layer, wherein said spacing layer is arranged between said inner layer and said adsorption layer and wherein said spacing layer comprises a material selected from the group consisting of a nonwoven fabric, a cellular plastic, and a textile cloth;
   wherein said adsorbent material of said adsorption layer is applied to a side of said textile substrate facing away from a foot of a wearer when said protective footware is being worn.

2. The protective footwear according to claim 1, wherein said outer layer, said inner layer, said adsorption layer, said membrane, and said spacing layer are joined to one another to alternatively form one of a layered construction and a composite.

3. The protective footwear according to claim 1, further comprising:
f.) a sole,
wherein said sole is at least partially impermeable to liquid water, air, and toxic chemical agents; and
wherein said sole comprises one of a plastic and a rubber.

4. The protective footwear according to claim 1, wherein said outer layer comprises a breathable, water-vapor permeable material selected from the group consisting of: a leather; a polyamide; and a plastic.

5. The protective footwear according to claim 1, wherein said outer layer comprises a plastic material.

6. The protective footwear according to claim 1, wherein said inner layer comprises a textile material.

7. The protective footwear according to claim 1, wherein said adsorption layer is discontinuously formed.

8. The protective footwear according to claim 1, wherein said adsorption layer comprises discrete particles of adsorbent.

9. The protective footwear according to claim 1, wherein said adsorbent material comprises activated carbon in a form selected from the group consisting of particles and fibers.

10. The protective footwear according to claim 1, wherein said adsorbent material of said adsorption layer comprises discrete particles of activated carbon, in a form selected from the group consisting of granular and spherical;
wherein said particles have a mean diameter from 0.1 to 1.0 mm;
wherein said activated carbon particles are applied to said substrate in an amount of 5-500 g/m$^2$; and
wherein said activated carbon particles have a specific surface (BET) of from 800 to 1,500 m$^2$/g.

11. The protective footwear according to claim 1, wherein said adsorbent material of said adsorption layer comprises activated carbon fibers comprising an activated carbon cloth, having a weight per unit area of 20-200 g/m$^2$.

12. The protective footwear according to claim 11, wherein said activated carbon cloth is a fabric selected from the group consisting of: a woven fabric; a knitted fabric; a layered fabric; a nonwoven fabric; and a bonded fabric.

13. The protective footwear according to claim 1, wherein said adsorbent material is impregnated with a catalyst selected from the group consisting of: enzymes and metal ions, and
wherein said catalyst is present in an amount of 0.05-12 wt. %, based on the weight of said adsorption layer.

14. The protective footwear according to claim 13, wherein said metal ions are ions of a metal selected from the group consisting of: copper; silver; cadmium; platinum; palladium; zinc; and mercury.

15. The protective footwear according to claim 1, wherein said membrane is selected from the group consisting of: a closed continuous membrane; and a microporous continuous membrane;
wherein said membrane has a thickness of 5-250 mm;
wherein said membrane is made of a material that exhibits a water vapor permeability of at least 12.5 L/m$^2$ per 24 hours, at a material thickness of 50 mm; and
wherein said material of said membrane exhibits a water vapor resistance R$_{et}$ of a maximum of 25 (m$^2$·pascal)/watt, measured under steady state conditions at 35° C. and at a material thickness of 50 mm.

16. The protective footwear according to claim 1, wherein said membrane is selected from the group consisting of: a plastic; and a polymer.

17. The protective footwear according to claim 16, wherein said plastic or polymer is selected from the group consisting of: polyurethanes; polyether amides; polyester amides; polytetrafluoroethylenes; cellulose-based polymers; and derivatives of the foregoing.

18. The protective footwear according to claim 1, wherein said membrane is formed as one selected from the group consisting of: a multilayer laminate; and a multilayer composite; and
wherein said selected multilayer laminate or multilayer composite contains at least three layers bonded together.

19. The protective footwear according to claim 18, wherein said selected multilayer laminate or multilayer composite comprises:
a.) a core layer, comprising a cellulose-based polymer, having a thickness of 5-100 mm; and
b.) two outer layers, one of said two outer layers being bonded to either side of said core layer, said outer layers comprising a material selected from the group consisting of: a polyurethane; a polyether amide; and a polyester amide, each of said outer layers having a thickness of 5-100 mm.

20. The protective footwear according to claim 1, wherein said membrane is on a substrate layer,
wherein said substrate layer is an air-permeable textile material selected from the group consisting of: a woven fabric; a machine-knitted fabric; a hand-knitted fabric; a layered fabric; a nonwoven fabric; and a bonded fabric;
wherein said substrate layer has a weight per unit area of not more than 150 g/m$^2$; and
wherein said membrane is laminated or bonded to said substrate layer with an adhesive layer.

21. The protective footwear according to claim 20, wherein said adhesive layer is applied discontinuously.

22. The protective footwear according to claim 1, wherein said protective footwear has a barrier effect against toxic chemical agents to an extent of allowing passage of a maximum of 4 mg/cm$^2$ per 24 hours of toxic chemical agent through said membrane.

23. The protective footwear according to claim 1, wherein the toxic chemical agents comprise at least one of chemical warfare agents and nuclear, biological and chemical (NBC) agents.

\* \* \* \* \*